US012800861B2

(12) United States Patent
Hendrix

(10) Patent No.: US 12,800,861 B2
(45) Date of Patent: Nov. 17, 2026

(54) OPTICAL DISTRIBUTION MODULE

(71) Applicant: viaPhoton LLC, Naperville, IL (US)

(72) Inventor: Walter Mark Hendrix, Dallas, TX (US)

(*) Notice: Subject to any disclaimer, the term of this patent is extended or adjusted under 35 U.S.C. 154(b) by 288 days.

(21) Appl. No.: 18/590,589

(22) Filed: Feb. 28, 2024

(65) Prior Publication Data

US 2024/0288652 A1 Aug. 29, 2024

Related U.S. Application Data

(60) Provisional application No. 63/448,857, filed on Feb. 28, 2023.

(51) Int. Cl.
*G02B 6/00* (2006.01)
*G02B 6/44* (2006.01)

(52) U.S. Cl.
CPC ....... *G02B 6/4454* (2013.01); *G02B 6/44528* (2023.05)

(58) Field of Classification Search
CPC .............. G02B 6/4454; G02B 6/44528; G02B 6/3823; G02B 6/3897; G02B 6/4452; G02B 6/4453; G02B 6/4455; G02B 6/00
See application file for complete search history.

(56) References Cited

U.S. PATENT DOCUMENTS

| | | | | |
|---|---|---|---|---|
| 10,295,771 | B2 * | 5/2019 | Burkett | G02B 6/44526 |
| 2010/0124392 | A1 * | 5/2010 | Reagan | G02B 6/445 385/139 |
| 2012/0051707 | A1 * | 3/2012 | Barnes | G02B 6/3636 29/525.01 |
| 2014/0314385 | A1 | 10/2014 | Miller | |
| 2019/0129116 | A1 | 5/2019 | Henley | |
| 2021/0072479 | A1 | 3/2021 | Ward | |

FOREIGN PATENT DOCUMENTS

| | | | |
|---|---|---|---|
| CN | 110456448 | A | 11/2019 |

* cited by examiner

*Primary Examiner* — Jennifer Doan
(74) *Attorney, Agent, or Firm* — Ferguson Braswell Fraser Kubasta PC

(57) ABSTRACT

An apparatus comprises at least one input optical connector on a front of a module for a panel. Two or more output optical connectors are located on the front of the module of the panel. A slack storage cassette secures optical fibers between the at least one input optical connector and the two or more output optical connectors.

20 Claims, 4 Drawing Sheets

OPTICAL DISTRIBUTION MODULE

CROSS-REFERENCE TO RELATED APPLICATIONS

This application claims the benefit of U.S. Provisional Application Ser. No. 63/448,857, filed Feb. 28, 2023, which is hereby incorporated by reference for all purposes.

BACKGROUND

In contemporary data center environments, rack and cabinet spaces are at a premium. The proliferation of network equipment has led to an increasing density of network connections that must be effectively managed to ensure optimal access and connectivity within limited spaces. As organizations strive for more scalable and flexible network infrastructures, cable management and equipment installation practices must be considered.

In conventional rack-mount panels, cables can be connected either from the back or the front of cabinet-mounted network equipment. The myriad of necessary connections often leads to cable clutter in congested spaces. In environments where rear access is either limited or entirely unfeasible, the limitation in access and the complexity of managing connections in tight spaces can lead to increased installation times, higher risks of cable damage, and difficulties in maintenance and troubleshooting. Restricted access to the rear of equipment complicates maintenance and upgrades for routing cables or fibers, and increasing the likelihood of significant downtime and operational disruptions when installing or modifying network infrastructure.

SUMMARY

In one aspect of the invention, an apparatus comprises at least one input optical connector on a front of a module for a panel. The apparatus also includes two or more output optical connectors on the front of the module of the panel. The apparatus additionally includes a slack storage cassette configured to secure optical fibers between the at least one input optical connector and the two or more output optical connectors.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Specific embodiments of the invention will now be described in detail with reference to the accompanying figures.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments are directed to an optical distribution module. View module incorporates a front-facing interface with multiple optical connectors, a slack storage cassette for organizing optical fibers, and integrated optical components for signal distribution and monitoring. The module is designed to fit into telecommunications racks, supporting a variety of optical fiber types and connector standards, with features for remote network management and energy efficiency. the module enables high-density configurations within a compact and modular framework enhancing network scalability and maintenance across various fiber types and connectors.

Figure 1:
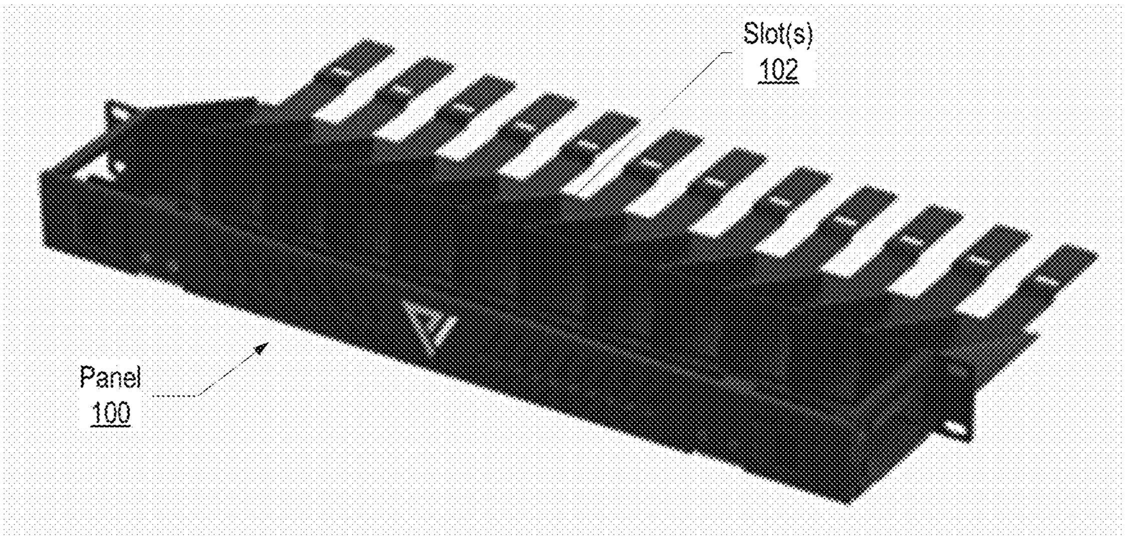
FIG. 1 shows a front perspective view of a panel according to illustrative embodiments.

Turning to FIG. 1, a front perspective view of a panel (100) is shown. In the context of cabinet-mounted network systems, a panel serves as the mounting point for various network equipment and connectivity modules. The panels are typically made from durable materials such as metal or high-strength plastic, designed to withstand the physical demands of a network environment. The panels are mounted within network cabinets, and are designed to host various types of network connectors, facilitating the connection of devices within the network.

The panel (100) is configured to fit into a standard rack size for telecommunications equipment. The sizes and dimensions of panels in cabinet-mounted network systems are governed by industry standards to ensure compatibility and interoperability across various network components and rack systems.

For example, the Electronic Industries Alliance (EIA) specifies rack units (U) as a measure for vertical space, where 1 RU is equal to 1.75 inches (or approximately 44.45 mm) in height. 1 RU can accommodate most compact devices such as patch panels or smaller network switches, while sizes of 2 U, 4 U, 6 U or greater may be necessary for larger equipment, including bigger network switches or panels that need a higher density of ports.

A width of 19-inch (482.60 mm) is typically used the rack standard across data centers, telecom rooms, and server rooms. Panel depth can vary based the type of equipment housed and the design of the rack.

The panel (100) includes one or more slot(s) (102). Each of the slot(s) (102) is configured to receive a module. The width of these slot(s) (102) typically corresponds to some consistent factor (or multiple thereof) across the rack width. As illustrated, the panel (100) includes twelve slots to accommodate modules of an equivalent size. Individual slot(s) (102) within the panel may feature snap-in mechanisms releasably securing modules in the panel.

Figure 2:
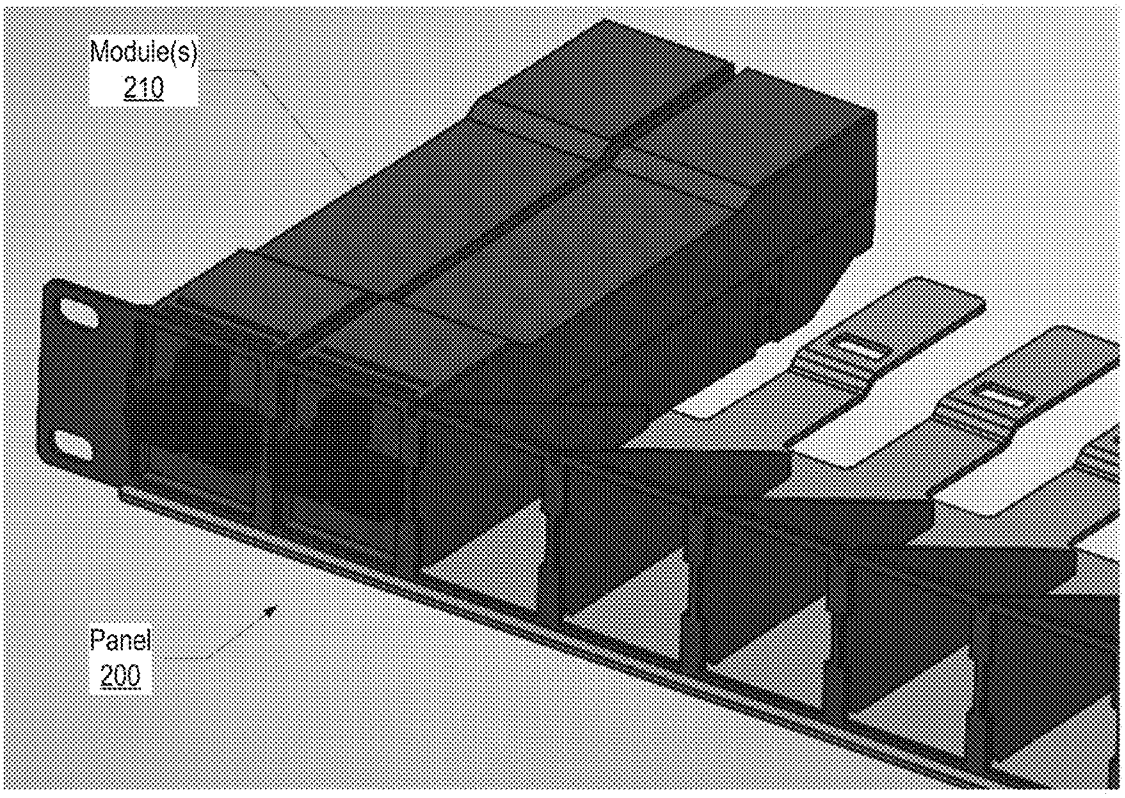
FIG. 2 shows a panel having multiple modules mounted therein according to illustrative embodiments.

FIG. 2 shows a panel having multiple modules mounted therein. Panel (200) is an implementation of panel (100) of FIG. 1.

As illustrated, Panel (200) includes one or more module(s) (210). As used herein, a module is a discrete unit or device designed to perform specific functions as part of the overall network infrastructure. The module(s) (210) facilitate the connection, management, and routing of data and power within the network system, and can vary widely in function. For example, a module may include fiber optic adapters and connectors, Ethernet jacks, power supply units, switch modules, and various signal processing units that enabling communication between different devices and systems of the network. In one embodiment, the modules (108) include connectors for two hundred eighty-eight (288) optical fibers per module.

The sizes and dimensions of modules are standardized for compatibility with the panels, with standard sizes that are dictated by the rack unit (RU). Modules themselves can be smaller than 1 U, designed to fit within a larger panel that occupies a standard unit space in a rack. For example, a panel may occupy 1 U of rack space and contain multiple fiber optic adapters. In some embodiments, the module may have an aspect ratio on the front face where height divided by the width is greater than 1.1.

Figure 3:
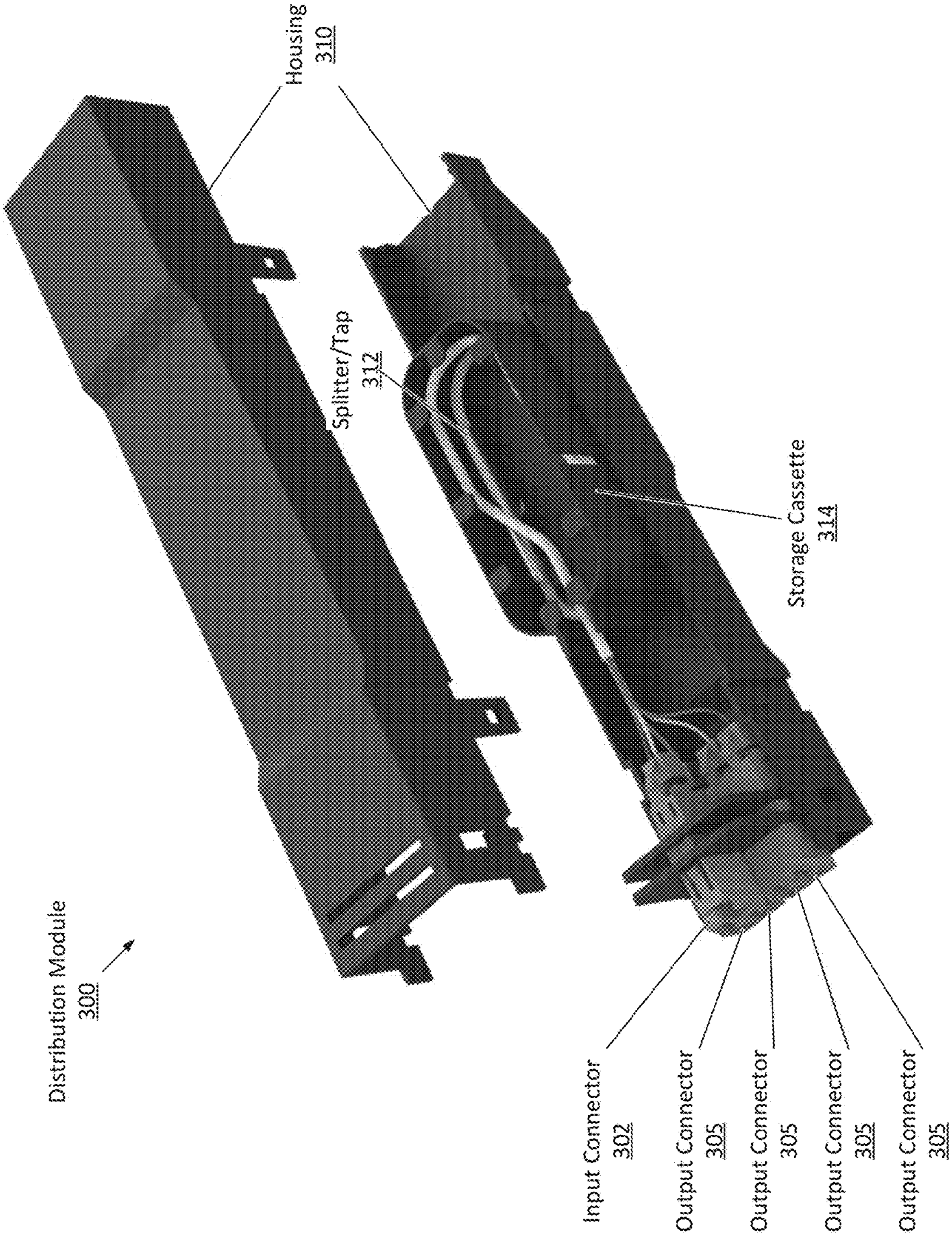
FIG. 3 shows an exploded view of a distribution module according to illustrative embodiments.

FIG. 3 shows an exploded view of a distribution module according to illustrative embodiments. The distribution module (300) is an implementation of module(s) (210) of FIG. 2.

In some examples, distribution modules (300) are designed to distribute optical signals in fiber optic networks from a single input fiber to multiple output fibers. For example, the distribution modules (300) may comprise a fiber optic splitter or optical tap.

The input connector (302) is an interface with one or more optical fibers, and is the point of entry for incoming optical signal into the module. The input connector (302) may be an industry-standard connector such as a standard connector (SC), Lucent connector (LC), or Multi-fiber Termination Push-on connector (MTP), depending on the network requirements.

The input connector (302) is on the front of the distribution module (300), which may fit into a panel. The panel may be a standardized telecommunications panel with 1 U height (e.g., 1.75 inches) for the distribution module (300). The input connector (302) is a female connector that receives a male connector with an optical fiber.

Output connector(s) (305) are the interfaces where the split optical signals are outputted from the module. The output connector(s) (305) through (308) are also on the front of the distribution module (300). The output connector(s) (305) through (308) are female connectors that each receives a male connector with an optical fiber.

The output connector(s) (305) may be an industry-standard connector such as a standard connector (SC), Lucent connector (LC), or Multi-fiber Termination Push-on connector (MTP), depending on the network requirements. The multiple output connectors distribute the signal to multiple destinations.

As illustrated, the distribution module (300) includes multiple output connector(s) (305). As such, the module may be deployed in a network that requires one input signal to be distributed to various locations, such as a telecommunication, data center, and/or other high-density network applications.

Housing (310) is the modular cover that encases the internal elements of the distribution module, providing protection and structural integrity. The housing (310) may be comprised of one or more portions, IE and upper housing and a lower housing, which can snap or screw together, creating a secure enclosure for the internal components.

The Splitter/Tap (312) divides the incoming optical signal into multiple outputs. Typically, splitters are used to divide the signal evenly, while taps split off a small portion of the signal for monitoring purposes. The Splitter/Tap (312) may comprise splitters or tabs such as, but not limited to, fused biconical taper (FBT) splitters, Planar Lightwave Circuit (PLC) splitters, fiber tabs, port taps, regenerative taps, and/or filtered taps.

Storage cassette (314) manages excess fiber length or for storing splices. As illustrated, the storage cassette (314) has a curved internal surface crucial that helps to reduce excessive bending or twisting of the fiber that could damage and/or degrade the signal.

Figure 4:
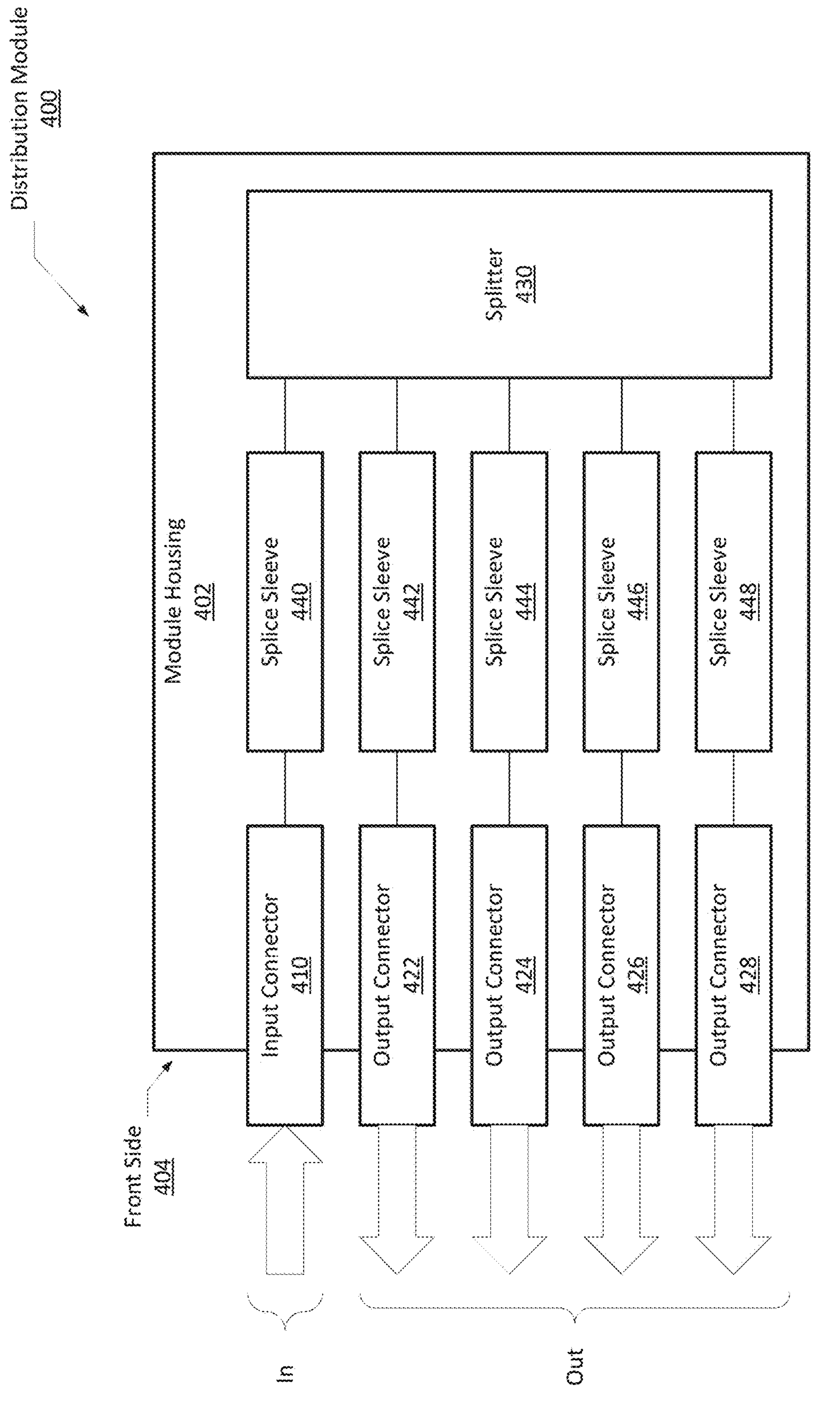
FIG. 4 shows a schematic diagram of an optical fiber distribution module with an optical splitter according to illustrative embodiments.

Referring now to FIG. 4, a schematic diagram of an optical fiber distribution module is shown according to illustrative embodiments. In this example, the module is designed to distribute an optical signal from a single input to multiple outputs via a splitter (430).

The distribution module (400) fits to a 1 U sized panel and splits the signal from one optical fiber to multiple optical fibers.

The module housing (402) encases all the internal components of the distribution module. The module housing (402) may provide mechanical protection and alignment for the internal parts, ensuring proper optical signal transmission and physical stability in an interchangeable modular architecture.

The distribution module (400) includes the input connector (410), the splice sleeves (440)-(448), the splitter (430), and output connectors (422)-(428).

All connections are made through the front side (404) of the module housing (402). The front side (404) is the user-facing interface side of the module. All the connectors for fiber input and output are located on the front side (404) for easy access, allowing network technicians to connect and disconnect the fiber optic cables as required.

In one embodiment, an optical fiber is connected to the distribution module (400) through the input connector (410). The input connector (410) is the entry point for the optical signal into the module. The input connector (410) is where the incoming fiber cable connects to the module. This connector type may be standardized (e.g., SC, LC) to ensure compatibility with fiber optic cables.

In one embodiment, each of the optical connectors may be an LC connector. An LC connector is a standardized connector configured for releasably securing optical fibers for a signal to pass from one optical fiber to another.

The input connector (410) is coupled to the splitter (430) through the input splice sleeve (440). The input splice sleeve (440) and the output splice sleeves (442, 444, 446, 448) each couple one optical fiber to another optical fiber.

The splice sleeve (440, 442, 444, 446, 448) are protective enclosures where fiber splices are housed. Each splice sleeve corresponds to a connection between the splitter's output and the output connectors. Each of the splice sleeves (440, 442, 444, 446, 448) allow for an optical signal to pass from one fiber to another. The optical fibers connected by a splice sleeve may be bonded together, which may reduce loss of the optical signal. the fibers are spliced within the module, and may transition from a fiber type used within the module to another type used in the external cabling.

The splitter (430) splits the signal from one optical fiber into signals for four optical fibers, dividing the incoming optical signal from the input connector into multiple outputs. The splitter may be a passive optical device that does not require power to operate, such as an FBT or PLC type that functions to evenly divide the signal with minimal loss.

The splitter (430) is coupled to the output connectors (422, 424, 426, 428) through the splice sleeves (442, 444, 446, 448). The output connectors (422, 424, 426, 428) are the endpoints for the optical signals after they have been split. Each output connector provides an interface for connecting the module to subsequent fiber optic cables leading to different destinations.

In operation, the optical signal enters the module through the input connector (410) and input splice sleeve (440). The signal is then directed to the splitter (430), which divides the signal into separate paths. Each path is led to an output splice sleeve (442, 444, 446, 448), where the signal from the splitter is spliced onto an output fiber. The spliced fibers are then connected to the output connectors (422, 424, 426, 428), from which the signals are sent out of the module to their respective destinations.

Figure 5:
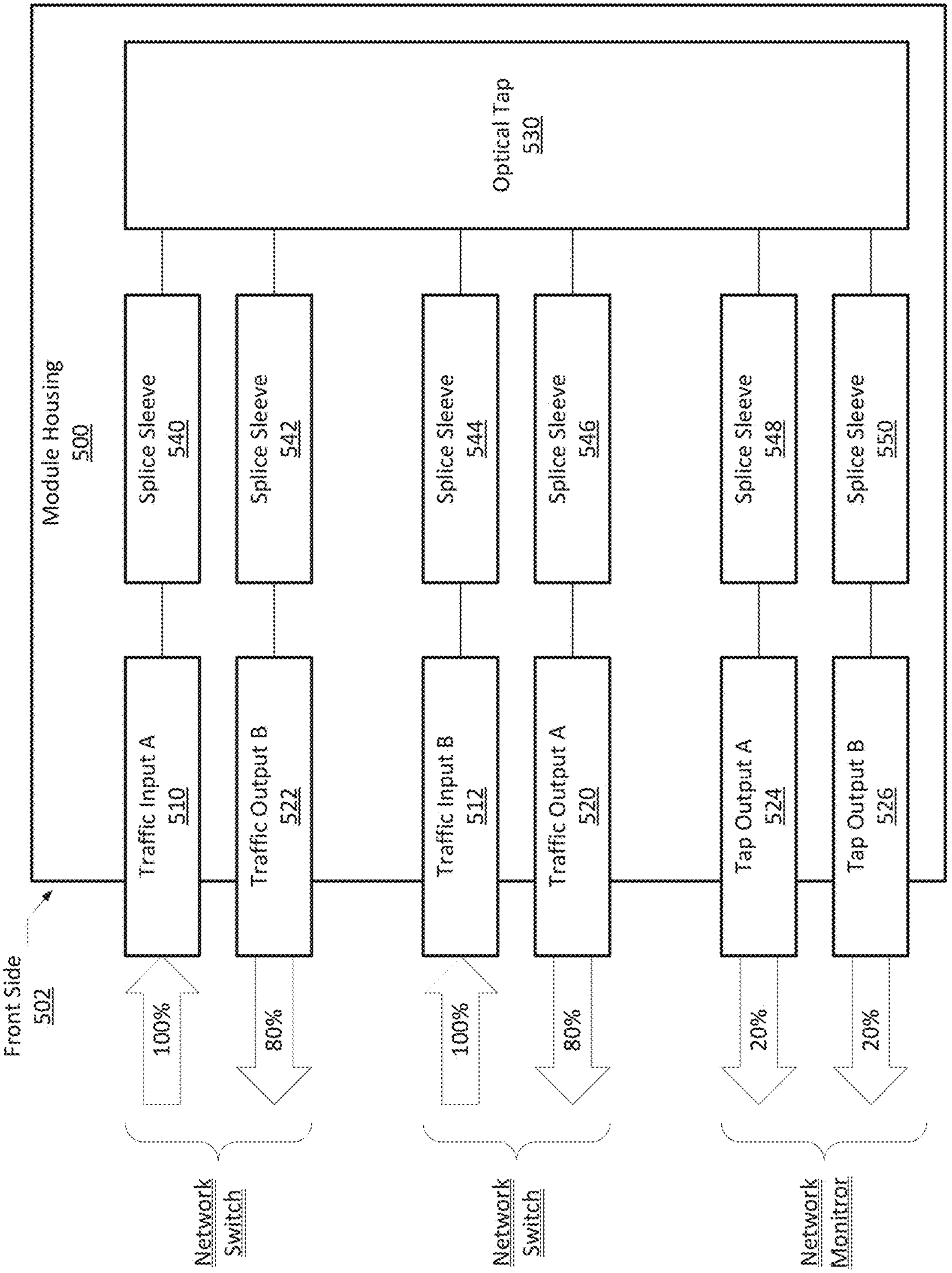
FIG. 5 shows a schematic diagram of an optical fiber distribution module with an optical tap according to illustrative embodiments.

Referring now to FIG. 5, a schematic of an optical tap module is shown according to illustrative embodiments. This optical tap module is employed within a network to facilitate traffic monitoring by duplicating a portion of the signal from a primary transmission line without disrupting the flow of traffic.

As depicted, the module may be deployed in a bidirectional monitoring setup, where two network switches are involved. Each switch's traffic can be monitored independently. The module may be pre-configured for quick deployment in a network environment. In practical terms, the module may be employed to monitor traffic for anomalies, performance metrics, and/or security breaches in a network environment.

Module housing (500) serves as the structural framework that contains and protects the optical tap and associated components. In some embodiments, the module housing (500), is designed to interface with network switches and a network monitor.

The optical signals from two different network switches enter the optical tap module at traffic input A (510) and traffic input B (512). Each input is associated with 100% of the signal from a respective network switch, indicating that the entire signal is being directed into the module for processing.

The major portion (80%) of the optical signals from each input (A and B) are directed to traffic output B (522) and traffic output A (520): after passing through the optical tap.

As illustrated, traffic output A (520) corresponds to traffic input A (510), and traffic output B (522) corresponds to traffic input B (512). This crossing of paths within the optical tap can be provided, for example, for bidirectional monitoring or to maintain the continuity of network traffic.

Tap output A (524) and tap output B (526) are connected to a network monitor and receive a smaller portion of the optical signals (20% each, for example) from the inputs. These taps allow the network monitor to sample the traffic for analysis, security, or performance monitoring without interrupting or significantly weakening the primary signal.

The optical tap (530) splits the incoming optical signals into two paths. One path carries the majority of the signal (80%, for example) to the network's primary output, ensuring the network's operation is unaffected. The other path diverts a smaller portion of the signal (20%, for example) to the network monitor, allowing for real-time traffic analysis without disrupting the data flow. The specific percentages of signal split (80/20) are typical for network taps, balancing between having a sufficient signal for monitoring purposes while ensuring the main signal path retains adequate signal integrity. However, other split ratios may also be utilized according to network requirements.

The splice sleeves (540, 542, 544, 546, 548, 550) are protective housings where fiber splices are contained. The splice joins two optical fibers end-to-end, with the splice sleeve provides physical protection and maintains the optical transmission characteristics at the splice junction. As depicted, each splice sleeve secures a connection between the optical tap's internal fiber pathways and the connectors for inputs, outputs, and tap outputs.

While FIGS. 1-5 show a configuration of components, other configurations may be used without departing from the scope of the invention. For example, various components may be combined to create a single component. As another example, the functionality performed by a single component may be performed by two or more components.

The term "about," when used with respect to a physical property that may be measured, refers to an engineering tolerance expected by or determined by one ordinary skill in the art. The exact quantified degree of an engineering tolerance depends on the product being produced, the process being performed, or the technical property being measured. For a non-limiting example, two angles may be "about congruent" if the values of the two angles are within ten percent of each other. However, if the ordinary artisan determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A could have been separate from component B, but is joined to component B in either a fixed or a removably attached arrangement. In a second meaning, unless otherwise stated, "connected to" means that component A is integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such, includes the term "and." Further, items joined by the term "or" may include any combination of the items with any number of each item, unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. An apparatus comprising:

at least one input optical connector on a front of a module for a panel;

two or more output optical connectors on the front of the module of the panel;

a slack storage cassette configured to secure optical fibers between the at least one input optical connector and the two or more output optical connectors;

a splitter arranged in the slack storage cassette on the optical fibers between the at least one input optical connector and the two or more output optical connectors; and an input splice sleeve on the optical fibers between the at least one input optical connector and the splitter.

2. The apparatus of claim 1, wherein the input optical connector and each of the output optical connectors is a female connector configured to receive a male connector with an optical fiber.

3. The apparatus of claim 1, wherein the at least one input optical connector and each of the two or more output optical connectors are standardized connectors selected from the group consisting of standard connectors (SC), Lucent connectors (LC), and Multi-fiber Termination Push-on connectors (MTP).

4. The apparatus of claim 1 further comprising:

two or more output splice sleeves between the splitter and the two or more output optical connectors.

5. The apparatus of claim 1, wherein the splitter is configured to divide an incoming optical signal into multiple output signals.

6. The apparatus of claim 1, wherein the splitter is a passive optical device that does not require power to operate.

7. The apparatus of claim 1, wherein:

the at least one input optical connector is configured to receive an optical signal, the splitter is an optical tap configured to split off a first portion of the optical signal to a first output connector of the two or more output optical connectors and a second portion of the optical signal to a second output connector of the two or more output optical connectors, and the first portion of the optical signal is larger than the second portion of the optical signal.

8. The apparatus of claim 7, further comprising:

a second input optical connector configured to receive a second optical signal, wherein the optical tap is configured to split off a first portion of the second optical signal to a third output connector of the two or more output optical connectors and a second portion of the second optical signal to the second output connector of the two or more output optical connectors, and wherein first portion of the second optical signal is larger than the second portion of the second optical signal.

9. The apparatus of claim 1, wherein the slack storage cassette includes a curved internal surface to reduce bending or twisting of the optical fibers.

10. The apparatus of claim 1, further comprising a housing that encloses the input optical connector, the output optical connectors, and the slack storage cassette.

11. The apparatus of claim 1, wherein;

the module is configured to fit into a standardized telecommunications panel with a 1 U height, and the front of the module of the panel has an aspect ratio where height divided by width is greater than 1.1.

12. An optical fiber management device for telecommunications networks, comprising:

a panel; and a plurality of modules, where in each module comprises:

at least one input optical connector on a front of a respective module;

two or more output optical connectors on the front of the respective module;

a slack storage cassette configured to secure optical fibers between the at least one input optical connector and the two or more output optical connectors, a splitter arranged in the slack storage cassette on the optical fibers between the at least one input optical connector and the two or more output optical connectors; and an input splice sleeve on the optical fibers between the at least one input optical connector and the splitter.

13. The optical fiber management device of claim 12 further comprising:

two or more output splice sleeves between the splitter and the two or more output optical connectors.

14. The optical fiber management device of claim 12, wherein the splitter is configured to divide an incoming optical signal into multiple.

15. The optical fiber management device of claim 12, wherein the splitter is a passive optical device that does not require power to operate.

16. The optical fiber management device of claim 12 wherein:

the at least one input optical connector is configured to receive an optical signal, the splitter is an optical tap configured to split off a first portion of the optical signal to a first output connector of the two or more output optical connectors and a second portion of the optical signal to a second output connector of the two or more output optical connectors, and the first portion of the optical signal is larger than the second portion of the optical signal.

17. The optical fiber management device of claim 16, further comprising:

a second input optical connector configured to receive a second optical signal, wherein the optical tap is configured to split off a first portion of the second optical signal to a third output connector of the two or more output optical connectors and a second portion of the second optical signal to the second output connector of the two or more output optical connectors, and wherein first portion of the second optical signal is larger than the second portion of the second optical signal.

18. The optical fiber management device of claim 12, wherein the slack storage cassette includes a curved internal surface to reduce bending or twisting of the optical fibers.

19. The optical fiber management device of claim 12, wherein:

the input optical connector and each of the output optical connectors is a female connector configured to receive a male connector with an optical fiber; and the input optical connector and each of the output optical connectors are standardized connectors selected from the group consisting of standard connectors (SC), Lucent connectors (LC), and Multi-fiber Termination Push-on connectors (MTP).

20. The apparatus of claim 1, further comprising a housing that encloses the input optical connector, the output optical connectors, and the slack storage cassette; and wherein the module is configured to fit into a standardized telecommunications panel with a 1 U height, and wherein the front of the module has an aspect ratio where height divided by width is greater than 1.1.

* * * * *